US009305683B1

(12) United States Patent
Bigbee, Jr. et al.

(10) Patent No.: US 9,305,683 B1
(45) Date of Patent: Apr. 5, 2016

(54) SYSTEM, APPARATUS, AND METHOD FOR EFFECTIVELY APPLYING PROPER SEQUENTIAL ALPHA-NUMERICS TO EXTRUDED WIRE AND CABLE

(71) Applicant: ENCORE WIRE CORPORATION, McKinney, TX (US)

(72) Inventors: William T. Bigbee, Jr., Melissa, TX (US); Mark D. Bennett, Bonham, TX (US)

(73) Assignee: Encore Wire Corporation, McKinney, TX (US)

( * ) Notice: Subject to any disclaimer, the term of this patent is extended or adjusted under 35 U.S.C. 154(b) by 0 days.

(21) Appl. No.: 14/453,538

(22) Filed: Aug. 6, 2014

Related U.S. Application Data

(63) Continuation of application No. 13/524,530, filed on Jun. 15, 2012, now Pat. No. 8,830,519.

(60) Provisional application No. 61/497,987, filed on Jun. 17, 2011.

(51) Int. Cl.

| | |
|---|---|
| ***G06F 3/12*** | (2006.01) |
| ***H01B 13/34*** | (2006.01) |
| ***B41F 17/10*** | (2006.01) |

(52) U.S. Cl.
CPC .............. *H01B 13/345* (2013.01); *B41F 17/10* (2013.01)

(58) Field of Classification Search
CPC ....................................................... B41F 17/10
See application file for complete search history.

(56) References Cited

U.S. PATENT DOCUMENTS

| | | | | | |
|---|---|---|---|---|---|
| 3,788,213 | A | * | 1/1974 | Brown et al. | 101/37 |
| 3,837,589 | A | | 9/1974 | Johnson et al. | |
| 4,029,006 | A | | 6/1977 | Mercer | |
| 4,085,357 | A | | 4/1978 | Ansberg et al. | |
| 4,370,542 | A | * | 1/1983 | Mills et al. | 219/121.68 |
| 4,419,798 | A | * | 12/1983 | Fairchild | 29/33 T |
| 4,638,558 | A | | 1/1987 | Eaton | |
| 5,049,721 | A | | 9/1991 | Parnas et al. | |
| 5,111,605 | A | | 5/1992 | Bossi | |
| 5,130,721 | A | | 7/1992 | Sukhman | |
| 5,237,917 | A | | 8/1993 | Traut et al. | |
| 5,285,723 | A | | 2/1994 | Ichikawa et al. | |
| 5,827,391 | A | | 10/1998 | Carriere et al. | |
| 6,038,377 | A | | 3/2000 | Christopher et al. | |

(Continued)

FOREIGN PATENT DOCUMENTS

| | | |
|---|---|---|
| CN | 2316258 | 4/1999 |
| CN | 201105819 | 8/2008 |

(Continued)

*Primary Examiner* — Matthew Luu
*Assistant Examiner* — John P Zimmermann
(74) *Attorney, Agent, or Firm* — Warren Rhoades LLP

(57) ABSTRACT

A process and system for printing sequences of alpha-numeric characters on segments of wire or cable during production. In one embodiment, the process and system comprises printing a sequence of alpha-numeric values onto a first segment of wire up to an input target value. The process and system further comprises printing a sequence of alpha-numeric values onto a second segment of wire up to a second input target value. In one embodiment, the process and system is capable of printing sequences on segments of wire or cable up to variable target values without requiring a shutdown of the production process, and without requiring lag time between printing on subsequent wire or cable segments.

9 Claims, 2 Drawing Sheets

(56) References Cited

U.S. PATENT DOCUMENTS

| | | | | |
|---|---|---|---|---|
| 6,176,155 | B1 * | 1/2001 | Palmowski et al. | 81/9.51 |
| 6,708,877 | B2 * | 3/2004 | Blankenship et al. | 235/375 |
| 6,808,574 | B1 | 10/2004 | Stevens et al. | |
| 6,873,879 | B2 | 3/2005 | Bush et al. | |
| 7,194,829 | B2 | 3/2007 | Boire et al. | |
| 2006/0125899 | A1 * | 6/2006 | Cornish et al. | 347/104 |
| 2007/0076234 | A1 | 4/2007 | Hopper et al. | |
| 2008/0114482 | A1 | 5/2008 | Malachowsky et al. | |
| 2008/0165379 | A1 | 7/2008 | Zuber | |

FOREIGN PATENT DOCUMENTS

| | | |
|---|---|---|
| JP | H10151810 | 6/1998 |
| WO | 2007074254 | 7/2007 |

* cited by examiner

SYSTEM, APPARATUS, AND METHOD FOR EFFECTIVELY APPLYING PROPER SEQUENTIAL ALPHA-NUMERICS TO EXTRUDED WIRE AND CABLE

CROSS-REFERENCE TO RELATED APPLICATIONS

This application is a Continuation of U.S. patent application Ser. No. 13/524,530, now U.S. Pat. No. 8,830,519, filed Jun. 15, 2012, which claims the priority benefit of U.S. Provisional Application Ser. No. 61/497,987, filed on Jun. 17, 2011, both of which are herein incorporated by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to application of alpha-numerics to a work piece in a production line, and particularly to the application of sequential numbering to extruded wire or cable during the production process.

2. Description of Related Art

In various industry manufacturing and production lines the inkjet printer is often used for printing various alpha-numeric characters on a product. In one example, sequential numbers are printed on a wire or cable during the wire extrusion process. The numbers may indicate a dimension of the wire, such as length. In other words, the entire length of wire includes printed numbers to indicate the length of the wire at any one particular location.

In order to manufacture wire with sequential numbering, machine operators set up a reel of bare wire on spooling device called the payoff reel. The wire is then run through one or more extruders that coat the wire with an insulator and sometimes a jacket. After the wire passes through the extruders, it encounters a printer head that applies the sequential numbering to indicate wire length at a particular point on the wire. A preset length of wire is typically specified and input by a printer operator and printed continuously onto the wire as it is extruded. Finally, the finished wire is spooled onto a take-up reel.

Generally, the length of bare wire on the reel at the payoff is substantially longer than the amount of finished wire placed on the take-up reel. This means that one reel on the payoff will often be used to create several reels of finished wire, and ideally the production process will not be interrupted until the payoff reel is empty. In many cases, the operator desires various lengths of wire or cable from the payoff reel. For example, supposing the operator desires a first segment of wire to have a length of 500', the operator will enter a preset length of 500' into the printer interface. The printer will print sequential alpha-numerics onto the wire as it is spooled and extruded until it reaches the "target number" of 500'. The printer will then reset to 0. If the operator desires the next segment to have a different length, for example 1000', the operator has two options: (1) enter a new target length as quickly as possible after the previous segment of wire is marked to the target number, or (2) stop the production line and reprogram the next batch target number.

The current systems and methods include significant and costly disadvantages. First, if the machine operator wishes to change the sequential numbering to a different target number without stopping production, the operator must enter a password and go through a number of steps in the printer's interface to reset the target. In addition to all of the steps necessary to adjust the target number, the process is further complicated due to a program interface that is anything but intuitive. Furthermore, as the machine operator is going through the process of changing the target number, the wire continues through the extruder, but the sequential numbering stops until the operator has finished making the adjustment in the program. Therefore, the wire that passes through the production line while the machine operator is in the program must then be scrapped because it does not include any sequential numbering. Finally, as a result of these many disadvantages, the operator must perform efficiently and quickly and thus the operator requires advanced training in order to perform the steps necessary to adjust the target number on current printers and printer interfaces.

Second, it is also be possible for the operator to shut down production while the target number is being changed. However, this would dramatically slow down production since many failures occur at startup, and because the machines must gradually be brought up to operating speed when they are started.

Thus, there is need in the art for a method and device with an easy to use printer interface that eliminates all of the process shortcomings listed above. There is also need in the art for a system and method that can efficiently alter the target number in a sequential alpha-numeric printing production process that does not require shutting down production, and does not result in wasted product.

BRIEF SUMMARY OF THE INVENTION

The present disclosure is directed to a process for printing sequential alpha-numeric characters on a wire or cable during the production process. In one embodiment, an operator instructs the printing system to print alpha-numeric characters on a segment of wire or cable from 0 to a target number. The operator then instructs the printing system to print alpha-numeric characters on a subsequent segment of wire or cable from 0 to a subsequent target number.

In another embodiment, a system is disclosed for printing a sequence of alpha-numeric characters on a wire or cable. The system comprises an add-on component capable of receiving a target number, and instructing a printing device to print a sequence of alpha numeric characters on a wire or cable from 0 to the target number. The add-on component is also capable of receiving a subsequent target number, and instructing the printing device to print a sequence of alpha numeric characters on a subsequent segment of wire or cable from 0 to the subsequent target number.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings.

DETAILED DESCRIPTION OF THE INVENTION

Figure 1:
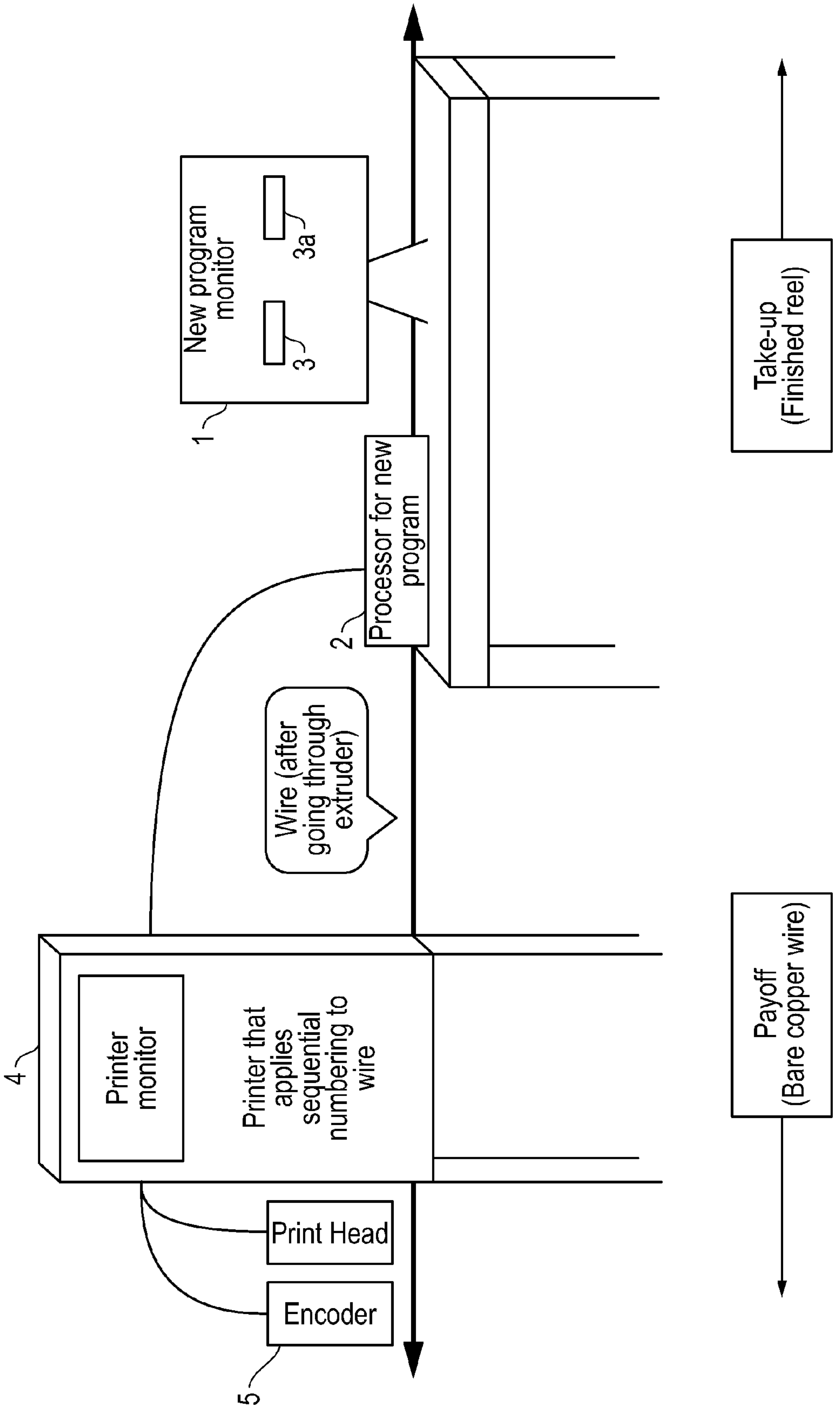
FIG. 1 illustrates one embodiment of the system used for applying sequential numbering to wire or cable.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by the accompanying claims.

The present disclosure is described below with reference to the Figures in which various embodiments of the present invention are shown. The subject matter of the disclosure may, however, be embodied in many different forms and should not be construed as limited to the exemplary embodiments set forth herein.

The present disclosure is directed to a system and method for effectively and cost efficiently, by reducing waste, applying sequential numbering or other alpha-numerical characters to wire or cable. According to embodiments of the present disclosure, the machine operator no longer needs to interact with the printer interface in order to adjust the target number. Alternatively, the machine operator interacts with a monitor that is in communication with at least one computer processing system, wherein the processor is also in communication with the printer to modify the target number during the production process.

FIG. 1 depicts one embodiment of the present system for producing extruded wire or cable and for printing sequential numbers onto the wire or cable. According to at least one embodiment of the present invention, the system comprises a user-interface on a monitor 1, which is connected to a processor 2 containing a sequence-numbering program. The monitor 1 displays a numerical data box 3 for inputting a target number. The target number represents the end value for a sequence of numbers that are printed on a segment of wire or cable following extrusion. An operator is able to enter a desired target number into the numerical data box 3. The monitor 1 and processor 2 are connected to a printing device 4. Once the target number is entered, the monitor 1 and computer processor 2 instruct the printing device 4 to print a sequence of alpha-numeric characters on a segment of wire or cable from 0 up to the target number. When the target number is reached, the printing device restarts at 0 and continues printing on a subsequent segment of wire or cable, unless the operator shuts down the production.

In addition to the numerical data box 3 for inputting the target number, there is further a second numerical box 3*a* on the monitor 1 interface. If an operator desires a different target number for a subsequent segment of wire or cable, the operator can input a new subsequent target number into the second numerical box 3*a*. This subsequent target number is input into the interface while the printing device 4 is printing on the segment of wire or cable corresponding to the first target number. When the currently printing segment of wire or cable is printed to the first target number, the printing device 4 automatically resets to 0 and prints a sequence of alpha-numeric characters on a subsequent segment of wire or cable from 0 to the new subsequent target number. Thus, there is no lag time between segments of wire or cable and no additional wire or cable is produced without sequential numbering.

Figure 2:
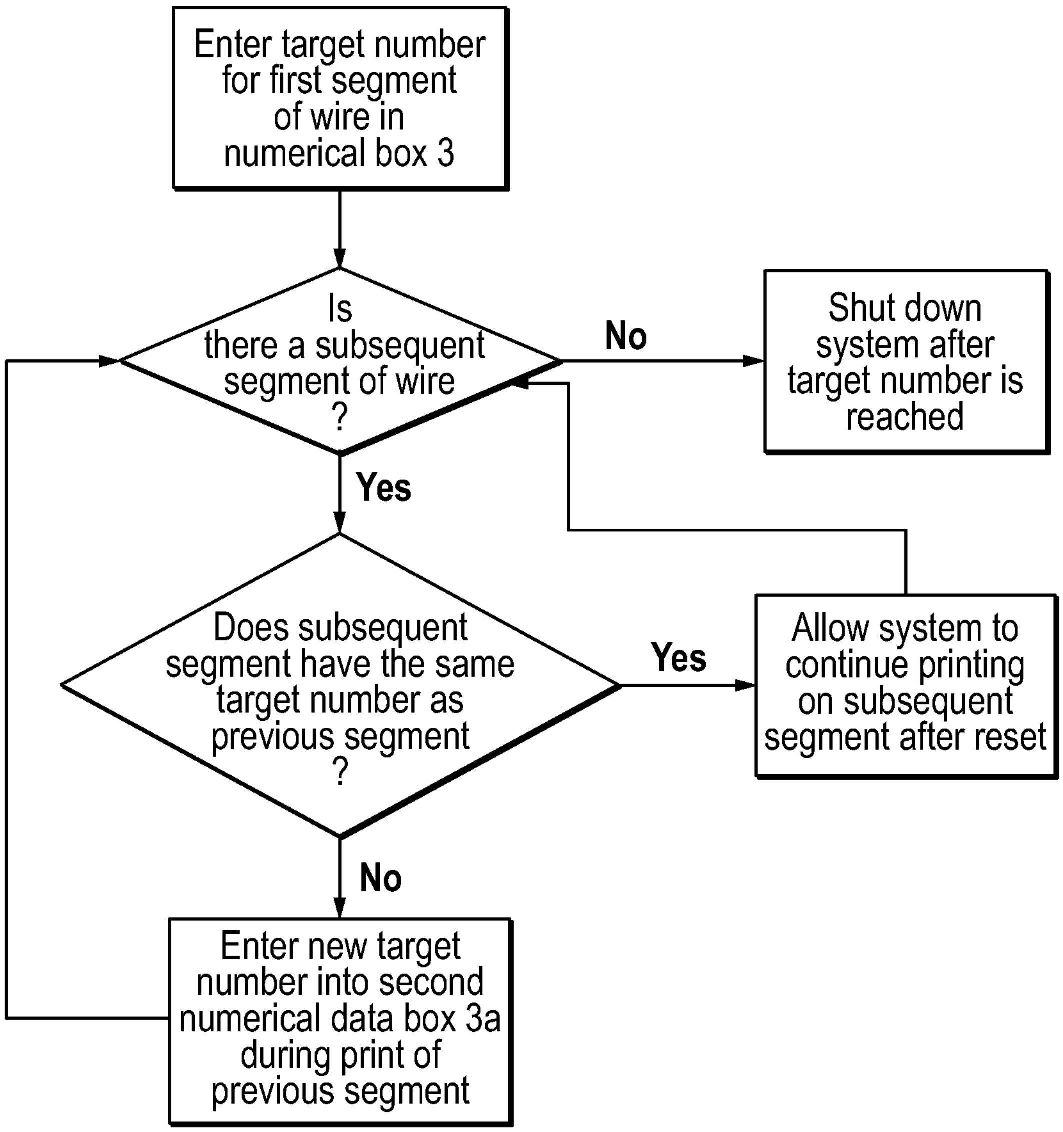
FIG. 2 illustrates a process workflow for applying sequential numbering to wire or cable.

FIG. 2, by way of non-limiting example, depicts a process workflow according to a preferred embodiment of the present invention. First, a target number is entered into the numerical data box 3. For example, if the operator desires to run a 500' reel of wire, the operator will enter 500' into the first numerical data box 3. The printing device 4 then prints sequential alpha-numeric characters, starting from 0, on the wire or cable after it passes through the extruder. When the target number of 500' is reached, thus indicating that 500' of wire has been extruded and printed, the printing device 4 will automatically reset to 0.

If the operator desires to continue extruding further subsequent 500' segments of wire, the operator will allow the system to continue printing sequential alpha-numeric characters on subsequent segments of wire to the same target number of 500'. However, if the operator does not want to continue producing wire, the operator will shut down the system after the first segment of wire is printed to the target number.

Alternatively, the operator may desire to extrude and print a segment of wire having a different length than the first or previous segment of wire. For example, if the operator wants to extrude a subsequent segment of wire having a length of 1000', the operator will enter 1000' into the second numerical data box 3*a*. This new value is entered during printing of the previous segment of wire. For example, when the previous segment of wire is printed to a target number of 500', the printer will automatically reset to 0 and print the subsequent segment of wire to the subsequent target number of 1000'. This process can be repeated until any number of wire or cable segments and desired lengths is achieved.

In another embodiment, the program is capable of storing data and allows operators to review previous run lengths and the date or time they were run through the sequential numbering process.

In yet another embodiment, the printer 4 uses a laser encoder 5 to relay footage information to the printer. As wire passes under the encoder 5, the encoder informs the printer 4 of the rate at which the wire is passing through so that the printer 4 can print the sequential numbering at the appropriate intervals.

One skilled in the art will recognize that different embodiments may be formed in a similar manner having different characteristics depending upon need, performance, or some other criteria. It will thus be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. A system for printing sequential alpha-numeric characters on a wire or cable, the system comprising:

a printing device;

a computer processing system in communication with the printing device, wherein the computer processing system includes a user interface;

the user interface for inputting a first target value and a second target value;

the computer processing system programmed to receive the first target value and second target value;

the computer processing system further programmed to instruct the printing device to print sequential alphanumeric characters on a first segment of wire or cable to the first target value; and the computer processing system further programmed to instruct the printing device to print sequential alphanumeric characters on a second segment of wire or cable to the second target value;

wherein the printing of the first segment of wire or cable and the second segment of wire or cable occur without lag time between the first segment of wire or cable and the second segment of wire or cable.

2. The system of claim 1, wherein the first target value and second target value correspond to a target length of the wire or cable.

3. The system of claim 1, wherein the second target value is not equal to the first target value.

4. The system of claim 1, wherein the computer processing system is programmed to receive the second target value during the print of sequential alpha-numeric characters onto the first segment of wire or cable.

5. The system of claim 1, wherein the printing device automatically resets to an alpha-numeric value of 0 after the first target value is achieved.

6. The system of claim 5, wherein the second segment of wire or cable is printed after the printing device is reset to 0.

7. The system of claim 1, wherein the computer processing system stores prior wire printing data, including the date a segment of wire was printed, the time a segment of wire was printed, or the amount of time to print a segment of wire.

8. The system of claim 1, further comprising a laser encoder to relay footage information to the printer.

9. The system of claim 1, wherein the computer processing system includes a monitor.

* * * * *